United States Patent [19]
Legg

[11] 3,907,124
[45] Sept. 23, 1975

[54] ARTICLE HANDLING APPARATUS
[76] Inventor: James B. Legg, 883 Pleasant Ridge, Columbus, Ohio 43209
[22] Filed: Aug. 2, 1974
[21] Appl. No.: 494,232

[52] U.S. Cl. ............ 214/1 BC; 198/20 R; 214/1 Q
[51] Int. Cl.² ......................................... B65G 47/52
[58] Field of Search ....... 214/1 B, 1 BC, 1 BD, 1 Q, 214/1 QA, 147 T; 198/20 R, 19, 243

[56] References Cited
UNITED STATES PATENTS

| | | | |
|---|---|---|---|
| 1,263,485 | 4/1918 | Thornburg | 214/1 BC X |
| 2,732,925 | 1/1956 | Pechy | 198/243 X |
| 3,034,822 | 5/1962 | Eldred | 214/1 BC X |

*Primary Examiner*—Frank E. Werner
*Attorney, Agent, or Firm*—Mahoney, Miller & Stebens

[57] ABSTRACT

Apparatus for handling articles, especially articles of glassware, which is of the rotating turret type carrying a series of tong units on radially extending arms, each of which receives an article at one point and transfers it to another point of delivery. The tong units and their actuating mechanism are designed to receive the articles while they are lying on their sides, with their axes horizontal, and during transfer to move them to an upright position, with their axes vertical.

10 Claims, 5 Drawing Figures

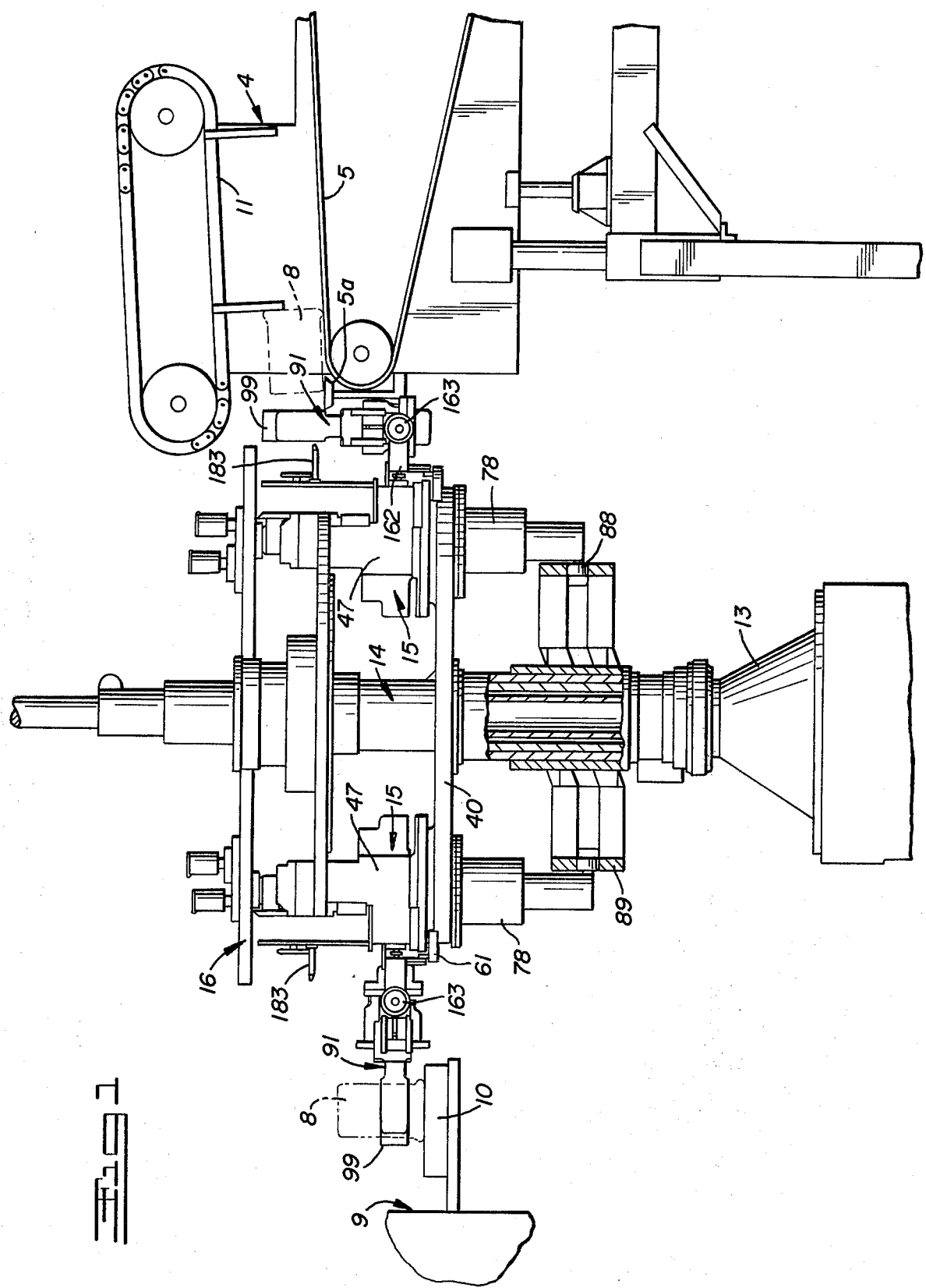

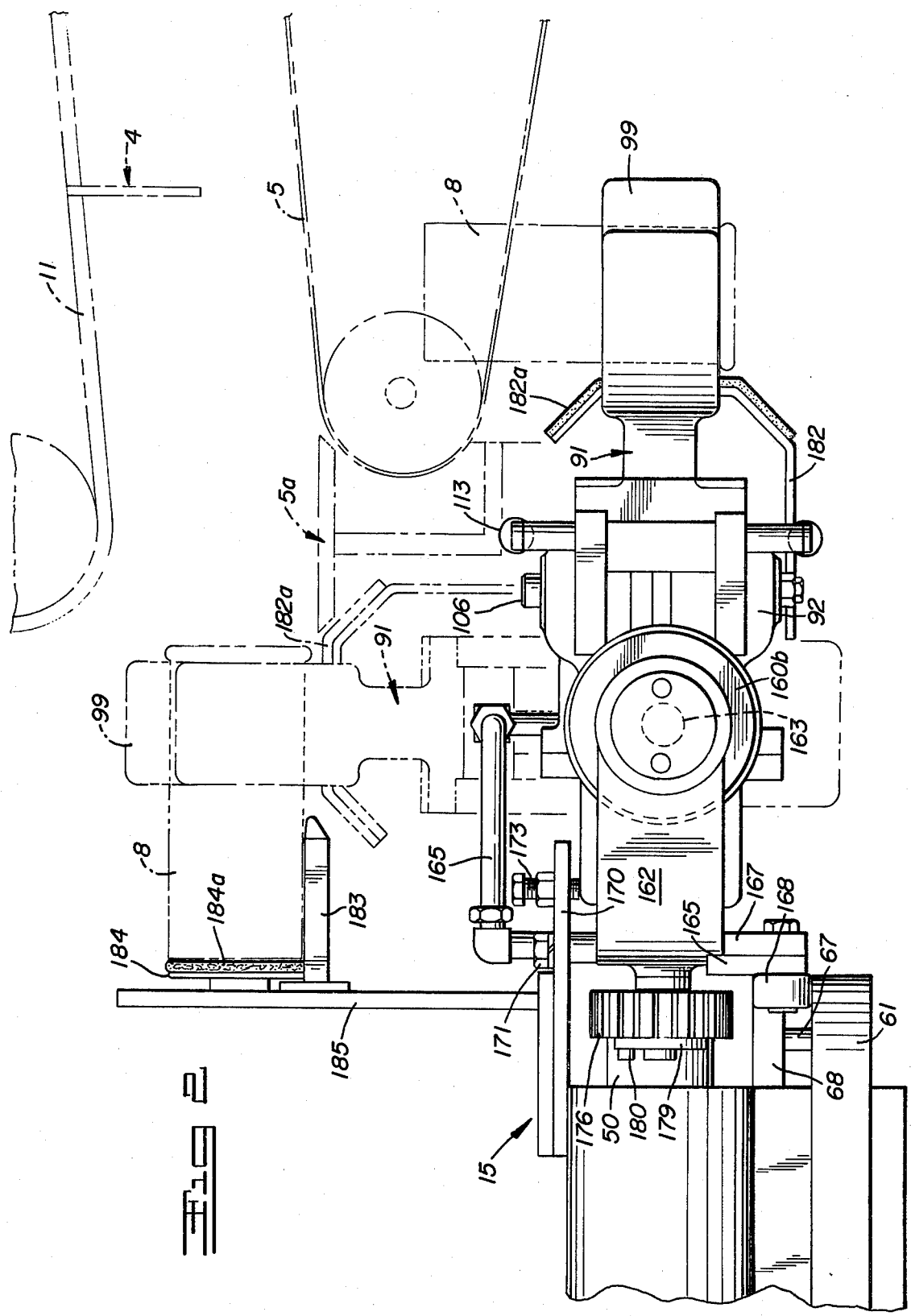

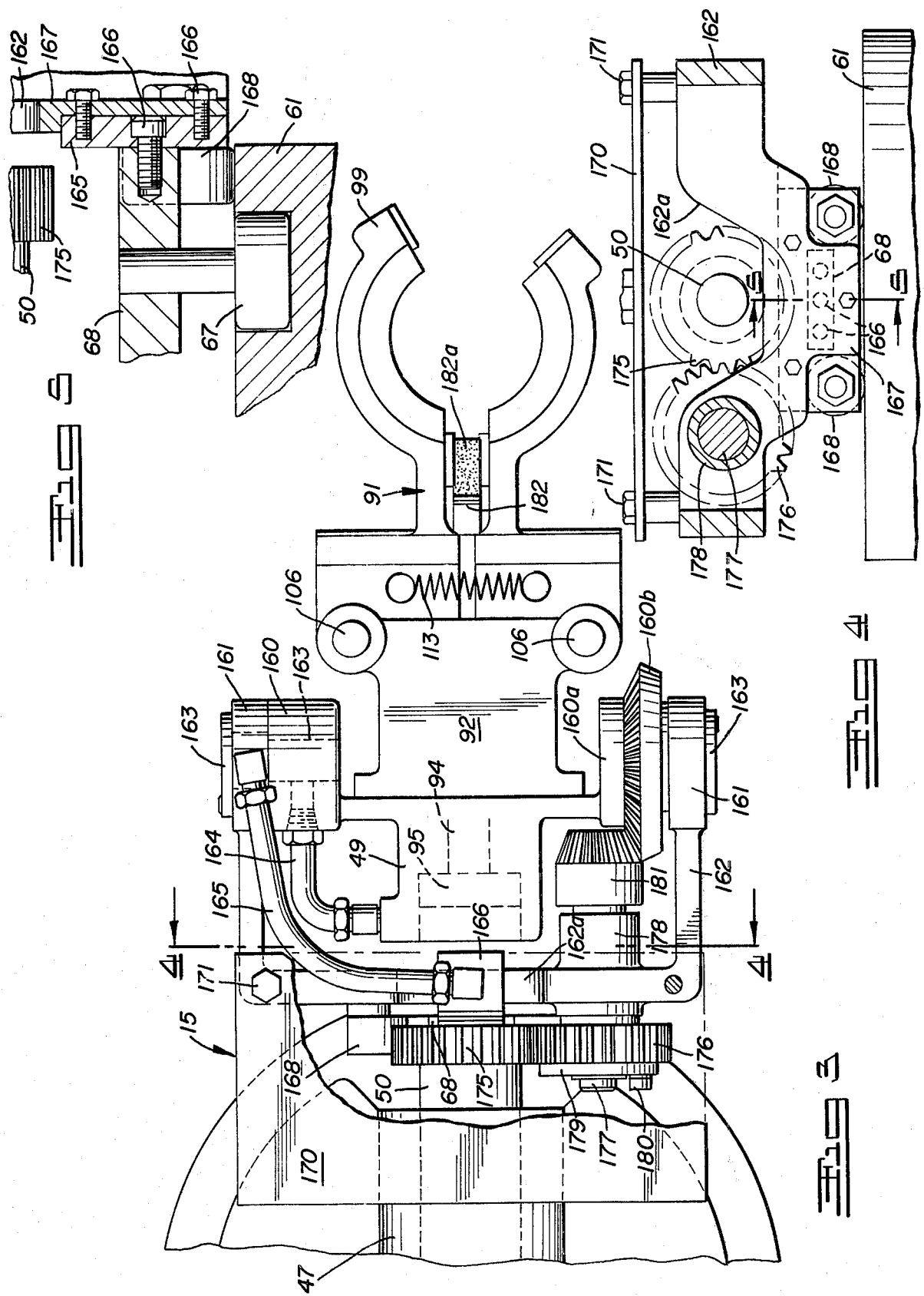

ARTICLE HANDLING APPARATUS

BACKGROUND OF THE INVENTION

The present invention relates to article handling apparatus of the general type disclosed in the patents to Eldred, U.S. Pat. Nos. 2,415,997; 3,034,822 and 3,200,964.

Each of the machines described in said patents consisted mainly of a continuously rotating turret which carried a plurality of radially extending circumferentially spaced article handling units. Each of these units included tongs which were adapted to grip successive articles supplied to the machine and transfer them to a point of delivery. The tong units and their actuating mechanisms were designed to receive the articles with their axes in a vertical position and deliver the articles with their axes in a similar vertical position but completely reversed.

SUMMARY OF THE INVENTION

The present invention provides, in a material handling machine of the general type disclosed in said patents, article-receiving and gripping tong units, and actuating mechanism therefor, which are especially designed and constructed to receive and grip the successive articles supplied thereto at a loading point of the turret, with the articles lying on the sides and having their axes horizontal; transfer the articles to a point of release and delivery and during that transfer, change their position to an upright position, with their axes vertical, in which condition they are released and deposited on a suitable receiver.

BRIEF DESCRIPTION OF THE DRAWINGS

The best mode contemplated in carrying out this invention is illustrated in the accompanying drawings in which:

FIG. 1 is a schematic view in side elevation and vertical section showing an article handling machine embodying the present invention.

FIG. 2 is a view mainly in side elevation of one of the tong units of the invention.

FIG. 3 is a top plan view, partly broken away, of that tong unit.

FIG. 4 is a transverse sectional view taken along line 4—4 of FIG. 3.

FIG. 5 is a transverse sectional view taken along line 5—5 of FIG. 4.

DETAILED DESCRIPTION OF THE INVENTION

With reference to the drawings, there is illustrated a glass-transferring machine of the same general structure disclosed in U.S. Pat. Nos. 2,415,997; 3,034,822 and 3,200,964. Only the parts of this machine necessary for an understanding of the present invention will be referred to herein as all the other details of the machine are fully disclosed in said patents. In general, this machine consists of a base and supporting standard 13, a rotatable turret 14 supported on the standard 13, a plurality of radially extending circumferentially spaced article handling units 15 carried by the turret, a control cam unit 16 mounted in fixed position above the rotatable turret 14 for controlling certain operations of the article handling units 15, and a cam track 89 which controls vertical swinging of the article-gripping tongs of the article handling units 15. Any suitable number of the units 15 may be provided. As explained in said patents, these units 15 include housings 47 that are carried on the table 40 of the turret 14 in such a manner that swinging movement horizontally and limited radial movement is permitted during rotation of the turret but the details of the mechanism for accomplishing these movements are not important in this present application.

The article-handling or transfer machine of this invention may be positioned between a supplying conveyor unit 4 of any suitable type and a receiving conveyor unit 9 of any suitable type or a circular machine table of a burnoff or other machine. The articles 8 are supplied while lying on their sides with their axes substantially horizontal and are moved to upright position, as the turret 14 rotates, and are deposited in upright position with their axes substantially vertical on the supports 10 of the unit 9. The unit 4 may include an endless belt conveyor 5 which brings the articles from a suitable source, and an endless paddle-type feeder 11 which successively pushes the articles 8 off the belt 5, across a bridge-plate 5a, to position them for successive gripping by the article handling units 15.

Each of the units 15 includes a tong-actuating cylinder structure 49 (FIG. 3), spaced radially outwardly from the housing 47, which encloses a piston 95 that has a piston-rod 94 connected to tone-actuating rack and pinion mechanism, of the type disclosed in said patents, which actuates the article-gripping tong jaws 99 of a tong unit 91 at proper intervals against the bias of a tension spring 113. The tong jaws 99 are pivoted for rocking movement to a support member 92 by means of the pivot pins 106, the member 92 being carried by the structure 49. This structure includes opposed integral bearing housings 160 and 160a. These bearing housings 160 and 160a are disposed within and cooperate with the axially aligning bearing collars 161 carried on the opposed arms of a supporting yoke 162. The housings 160 and 160a enclose suitable anti-friction bearings and are rotatably connected to the respective collars 161 by means of the trunnion bearing pins 163. Thus, the entire tong unit 91 is mounted for vertical swinging movement within the supporting yoke 162 about the aligning axes of the opposed trunnion pins 163. Air is supplied to the cylinder 49 by means of a conduit 164, which connects through one of the cooperating bearing housings 160 and cooperating collars 161 to a conduit 165, which connects to the center of a shaft 50 at a fitting 166 which is rotatably connected to the shaft, so as not to interfere with rotation of it. Air is supplied through the shaft 50 as described in U.S. Pat. No. 3,200,964. Thus, regardless of the vertical position of tong unit 91, about the pivot axis 163, or the rotative position of shaft 50, air can be supplied to the cylinder 49. It will be noted (FIGS. 3 and 4) that the transverse portion of the yoke 162 is curved downwardly at 162a to provide space for the fitting 166.

The yoke 162 is connected to the plate 68 which is mounted for radial sliding movement relative to the housing 47 similar to the plate 68 of U.S. Pat. No. 3,200,964. As described in said patent, the radial movement of the plate is produced by a cam follower 67 operating in a cam groove in a fixed cam plate 61. The outer end of the plate 68 (FIGS. 4 and 5) is anchored to an upright bracket plate 165 by means of cap screws 166. This bracket 165 is recessed into the face of the depending portion 167 of the yoke 162. The bracket 165 carries a pair of rollers 168 at its lower edge which will rest on and operate on the upper surface of the plate 61. During oscillations of the housing 47, produced as described in said patents, the rollers 168 will roll on the plate 61 and during the limited radial movement of the plate 68, they will slide thereon. A cover and guard plate 170 is mounted on top of the yoke 162, by means of bolts and spacers 171, and beneath this cover plate are some of the gears of the train which produces vertical swinging of the tong unit about the pivot 163. The plate 170 is fastened to the yoke 162 but is free to slide relative to the housing 47. A stop screw 173 is adjustably threaded through the plate 170 (FIG. 2) to engage the structure 49 to limit downward swinging movement about the axis 163.

The train of gears includes the pinion 175 keyed on the outer end of the shaft 50 for rotation therewith. As described in U.S. Pat. No. 3,200,964, the shaft 50 is oscillated about its axis by rack and gear mechanism disposed within the respective housing 78, depending from the table 40, and actuated by means of a follower 88 moving along the track 89. The pinion 175 meshes with a pinion 176 carried at the inner end of a stub shaft 177 mounted for rotation in a bearing 178 formed on the yoke 162. The pinion 176 can be angularly set on the shaft 177 by rotating it relative to a disc 179 which is keyed to the shaft and is in face contact with the pinion. A clamping screw 180 extending through an arcuate slot (not shown) in the disc 179 and tapped into the pinion 176, will clamp the pinion 176 in angularly adjusted position about the shaft 177. As will be evident later, this provides for accurate positioning of the tong unit 91 as it swings into final horizontal and vertical positions. The shaft 177 carries at its outer end a bevel pinion 181, which is keyed thereto, and this pinion meshes with a bevel pinion 160*b* which is formed as a part of the bearing housing 160*a*. Thus, rotation of shaft 50 will produce rotation of shaft 177 and this will result in swinging of the tong unit 91 about the pivot axis 163.

Each of the tong units 91 includes a guard and guide structure 182, which is in the form of a substantially U-shape metal bracket, which is fixed to the member 92 at its lower side (FIG. 2) and extends outwardly and upwardly between the jaws 99 and then inwardly over the upper edges of the jaws. This member 182 carries an asbestos cover or cushion strip 182*a*. The member 182 is so formed and positioned that when the article 8 is being loaded into the separated jaws of the tong unit (FIG. 2), the part 182 extending between the jaws will be horizontal and as the article 8 moves off the bridge plate 5*a*, it will slide over the cushion strip 182*a* and onto a cradle provided by the fingers 183 which cooperate with the part 182 to support the article. These fingers 183 are properly spaced apart and project outwardly at the proper level from an upstanding support plate 185 which is carried at its lower end on the plate 170. At the inner end of the cradle is a stop pad 184*a*, preferably of asbestos, carried by a disc 184 mounted on the outer face of the plate 185.

It will be apparent from the above, with reference to FIG. 2, that articles 8 will be successively fed by the feeder 11 while lying on their sides with their axes substantially horizontal. As the turret 14 rotates, they will be pushed between the jaws of the tong unit which will be upright and spread at this time, the article-receiving position being indicated in broken lines in FIG. 2. Each article is pushed over the bridge plate 5a and between the jaws 99 of the respective tong unit onto the fingers 183 into contact with the stop pad 184*a*. As the turret 14 continues to rotate, the jaws 99 of that unit 91 will close around the supported article 8 and the tong unit 91 will gradually be swung downwardly until it reaches the full line position shown in FIG. 2. This is the unloading position which is indicated in FIG. 1 at the left and, at this time, the jaws will be separated to release the article 8, which at this time has its axis vertical, and will set it down on the support 10.

Thus, the present invention provides, in a material handling machine of the general type disclosed in said patents, article-receiving and gripping tong units, and actuating mechanism therefor, which are especially designed and constructed to receive and grip the successive articles supplied thereto at a loading point of the turret, with the articles lying on the sides and having their axes horizontal; transfer the articles to a point of release and delivery and during that transfer, change their position to an upright position, with their axes vertical, in which condition they are released and deposited on a suitable receiver or into a vacuum chuck or the like.

Having thus described my invention, what is claimed is:

1. Apparatus for handling articles comprising a rotatable turret, an article-handling unit mounted on the turret and extending radially thereof, said article handling unit including a tong unit having jaws which are adapted to grip the article with its axis extending therethrough, said tong unit being mounted on said article-handling unit for vertical swinging movement about a transverse pivot axis, said turret moving the article-handling unit between a loading station and a discharge station at angularly spaced positions around the turret, means for feeding an article to the tong unit at the loading station with its axis substantially horizontal, support means at the discharge station for receiving the article released by the tong unit with its axis substantially vertical, means for swinging the tong unit about its transverse pivot axis causing it to be in a substantially vertical plane when at the loading station to receive the article with its axis substantially horizontal and to be in a substantially horizontal plane at the discharge station to permit release of the article with its axis substantially vertical, and means for operating said tong unit to open it to receive the article at said loading station, to close it to grip the article during rotation of the tong unit with the turret, and to open the tong unit at the discharge station to release the article, said tong unit comprising a pair of pivoted cooperating jaws adapted to receive the article therebetween, said jaws being spread-apart in a substantially vertical plane at the loading station for receiving the article, means at said loading station for feeding the article axially into the spaced jaws with its axis substantially horizontal, and means beyond the jaws in the direction of feed for engaging the leading portion of the article as it is loaded into the spread jaws to aid in supporting it until the jaws close about it during movement of the turret.

2. Apparatus according to claim 1 in which the supporting means for the article comprises fingers carried by the turret adjacent the spread jaws to cradle and support the article, and stop means for limiting the axial feeding of the article relative to the jaws.

3. Apparatus according to claim 2 including an additional support and guide means extending through said tong unit between said jaws adjacent their pivoted ends so that when they are spread and located in the vertical plane at the loading station, the support and guide means will direct the axially fed article onto said support fingers.

4. Apparatus according to claim 3 in which a plurality of the article handling units are provided at angularly spaced positions about the turret, each of said units including a radially-extending rotatable shaft, and gearing connecting said rotatable shaft to the tong unit of each article-handling unit for swinging it about its pivot axis, and means for swinging the tong unit about its pivot axis as the turret is rotated comprising means for rotating said shaft.

5. Apparatus according to claim 4 in which said article handling unit comprises a supporting yoke within which the tong unit is pivoted by pivot structures for swinging movement about the pivot axis, said gearing comprising a bevel gear carried by the tong unit at said axis, a bevel gear in engagement therewith and carried by said yoke, and gears connecting said last-named bevel gear to said shaft.

6. Apparatus according to claim 5 in which the tong unit includes a cylinder and piston unit, and a fluid conduit rotatably connected to said shaft and extending from a passage in said shaft through one of said pivot structures to said cylinder and piston unit to supply actuating fluid thereto regardless of the rotative position of said shaft or the pivoted position of said tong unit.

7. Apparatus according to claim 6 including stop means carried on said yoke and engaging said tong unit for limiting its swinging movement.

8. Apparatus according to claim 7 in which the gear train includes relatively rotatably adjustable gears to accurately determine the positions of the tong unit about said pivot axis.

9. Apparatus according to claim 8 in which said means for rotating the shaft comprises cam means actuated by rotation of the turret, said means for supplying fluid to said cylinder and piston unit also comprising cam means actuated by rotation of the turret.

10. Apparatus according to claim 4 in which the article-handling units are mounted for radial movement on the turret and oscillating movement about vertical axes on the turret, each of said units including a radially-extending rotatable shaft which is axially movable on its respective unit and a yoke within which the tong unit is pivoted by pivot units for swinging movement about the pivot axis, said yoke being supported by rollers which engage a portion of said turret, and gearing connecting said shaft to said pivot units so that rotation of the shaft produces pivoting of the tong unit within the yoke.

* * * * *